March 17, 1942.   P. M. FARMER   2,276,293
ARTICLE ORDER ASSEMBLY SYSTEM AND APPARATUS THEREFOR
Filed May 4, 1938   3 Sheets-Sheet 1
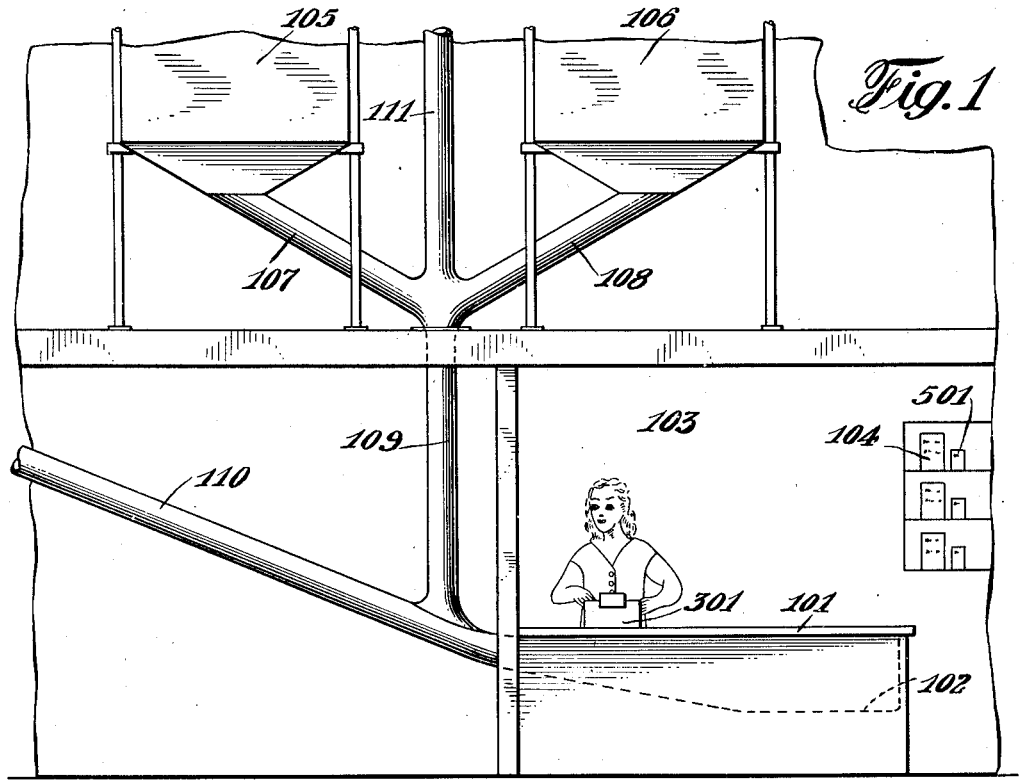
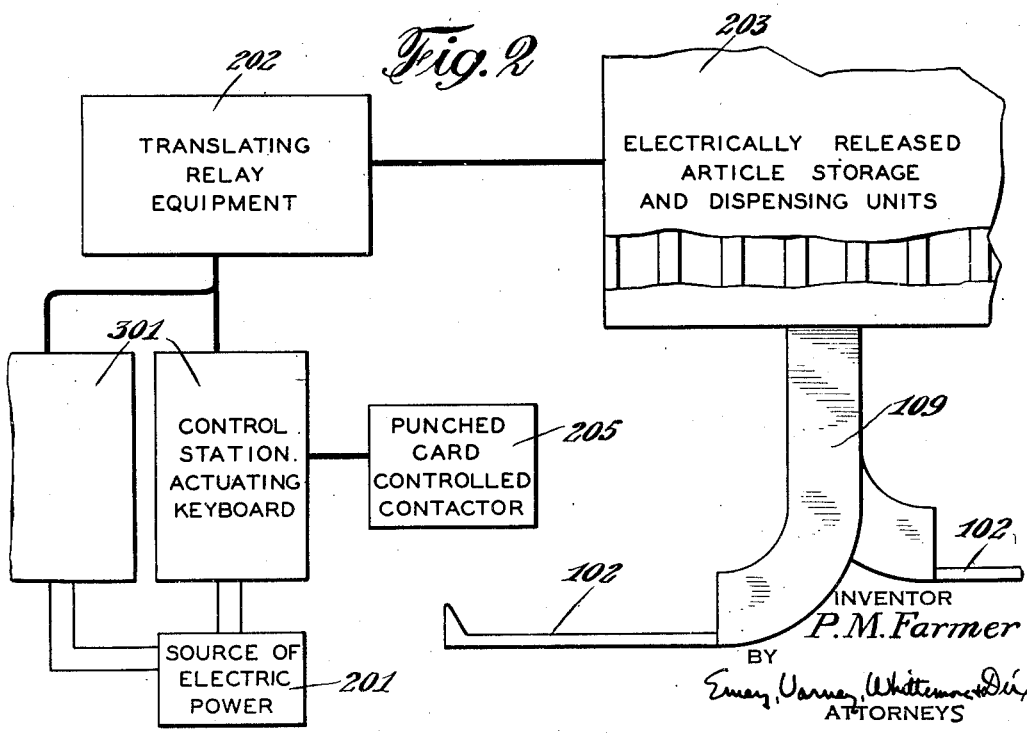
INVENTOR
P. M. Farmer
BY
ATTORNEYS

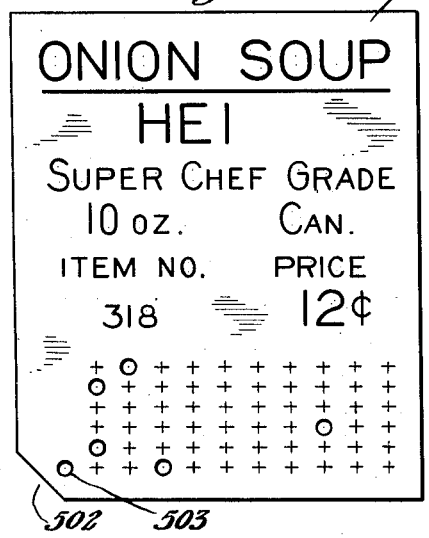
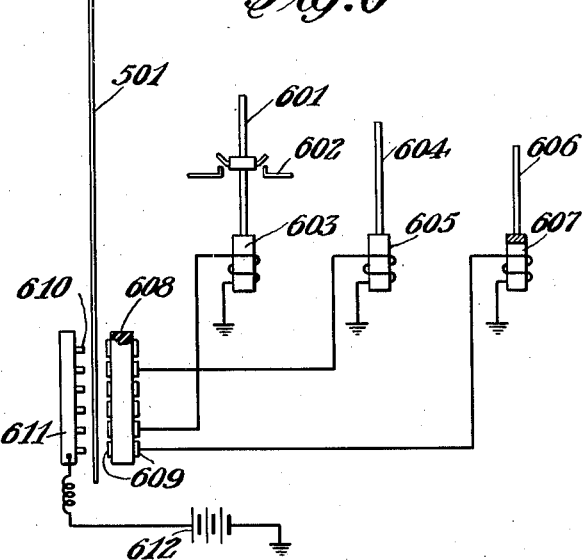
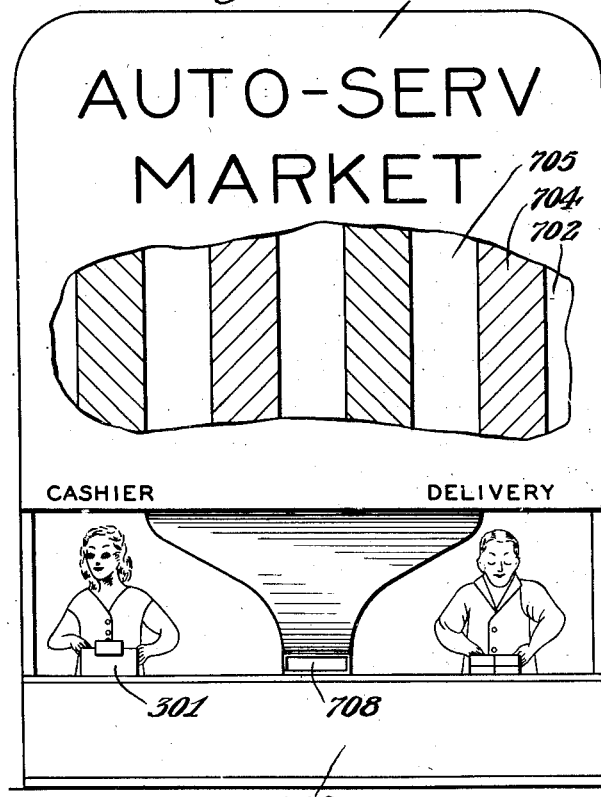
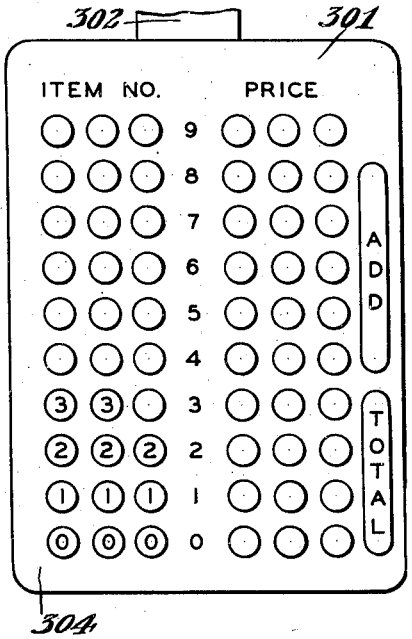

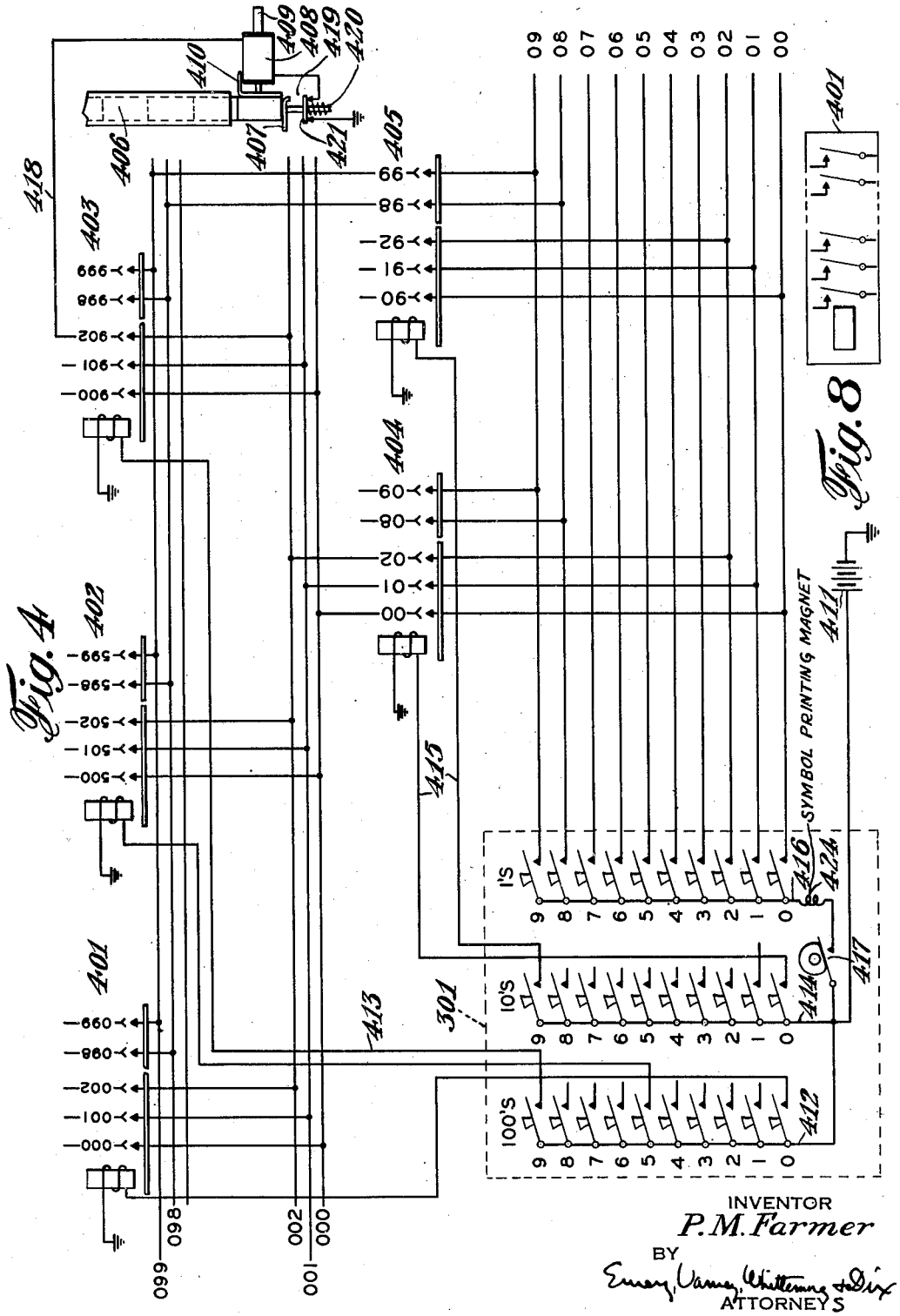

Patented Mar. 17, 1942

2,276,293

UNITED STATES PATENT OFFICE 2,276,293

ARTICLE ORDER ASSEMBLY SYSTEM AND APPARATUS THEREFOR

Paul M. Farmer, Maplewood, N. J.

Application May 4, 1938, Serial No. 206,089

3 Claims. (Cl. 234—1.5)

This invention pertains to an improved system and apparatus for selecting and assembling articles stored in different locations, and recording data in regard to separate orders or groups of articles.

More particularly, the invention relates to a novel system especially adapted for use in stores or for other applications, to mechanize order handling operations which are ordinarily accomplished manually.

The invention also relates to a novel arrangement of key controls and dispensing elements which release selected articles substantially simultaneously with actuation of corresponding key controls, for delivery to a designated point, and by the same actuation prepares a detailed sales slip and a retained record of the numbers and prices of ordered articles.

The recording feature is particularly advantageous to the customer for checking the particular order and to the merchant for other more general statistical purposes, such as for sales records, stock replenishing and the like.

Another feature of this invention is to provide mechanized merchandising facilities that will improve the character of the salesroom and provide greater convenience and speed of handling to the customer and that will eliminate pilferage losses as well as those resulting from the pinching and handling of merchandise.

Another important feature of this invention is a novel arrangement whereby with a system dispensing various articles by mechanized means, provision will be automatically made for handling on the same order, articles which may be out of stock or which cannot readily be dispensed by mechanical means.

Some of the more practical objectives of this invention are to reduce the cost, minimize time involved and insure greater accuracy in assembling orders of various objects while at the same time automatically providing useful and accurate associated records. This is accomplished by so mechanizing the process that the human element is largely eliminated. A few relatively untrained and inexperienced persons can thus handle the comparatively large volume of business that is essential to economically justify the high cost of such mechanization.

As applied practically, for one example, to retail merchandizing, it is desirable to provide samples or illustrations of the offered merchandize and to display them about the sales room, or other desirable places. Associated with each of the separate displays would be a supply of order tickets each bearing the item or product number and the price of that particular item together with such descriptive matter or sales message as might be considered desirable. The customer selects an order ticket corresponding to each desired article. These are handed to the cashier who is provided with a selective control and associated recording means. The various ordered articles are thus automatically assembled and a sales record concurrently made by the cashier, as will be explained hereinafter. Other auxiliary features of the invention will also appear from the following description and the accompanying illustrations of the embodiments of the invention.

As disclosed herein the system covered by this invention is adaptable, with clearly obvious variations, to a wide variety of applications particularly in the field of retail merchandizing, wholesale distribution, and in production assembly and other places. It is not intended, therefore, that the detail description given herein will limit the scope of this invention to the precise detail described.

In the following drawings which are made a part of this specification:

Fig. 1 is an elevational view, partially in section, of a typical installation of the basic form of system covered by this invention;

Fig. 2 is a diagrammatic chart indicating the component elements of the described system;

Fig. 3 is a detailed layout of a typical control station keyboard;

Fig. 4 is a wiring diagram of a three digit item number system;

Fig. 5 is a layout of an order ticket showing punchings for automatic actuating of a control station;

Fig. 6 is a wiring diagram including a side elevation of a punched card contactor element and showing the actuating control at a control station by means of punched cards; and Fig. 7 is a front elevational view, partially in section of a self-contained "service unit" utilizing the system covered by this invention.

Fig. 8 is a diagrammatic view of another type of switching means that may be employed in the apparatus diagrammatically illustrated in Fig. 4.

Referring now to Fig. 1, a building is shown in partial section to illustrate a control desk or station 301 which is associated with wrapping counter 101 and delivery station 102 in room 103 remote from the stored articles, the movements of which are controlled by the control station 301. As adapted to retail merchandizing, the items or products offered for sale would preferably be displayed by means of conveniently placed samples (or illustrations) 104 with each of which would be associated a card holder carrying a supply of order tickets 501. These samples and cards would show and record the different kinds and brands and price of the products or articles.

At 105 and 106 in other parts of the building are shown enclosures or magazines or bins, each housing a group of articles, the movements of which are electrically controlled. The storage compartments are of a size and character to accommodate the particular items it is required to handle. The release magnets of dispensing elements are electrically connected through translating relay equipment with control station 301.

Suitable conveyor means such as a system of chutes 107, 108, and 109, is provided for conveying (by gravity in this instance, or otherwise), released articles from 105 and 106 to delivery station 102. Chute 110 would connect to other dispensing elements in another portion of the same floor. Chute 111 would serve higher floors.

Suitable conveyor systems could be provided to serve widely varying arrangements of storage and delivery. Gravity chutes or conveyors would be utilized wherever possible because of the greater speed of handling and because of their greater simplicity and economy of investment and operation.

In Fig. 2 there is diagrammatically illustrated the component elements of the basic system herein. A source of electric power 201 for operation of the system is shown as supplying one or more control stations 301 with current for setting up the item number and price of desired articles. Relay equipment 202 is provided for translating the comparatively few contacts of the keyboard to the comparatively large number of possible article selections. For descriptive purposes, this feature is hereinafter referred to as a "digit key control means." 203 represents banks of article storage and dispensing elements. A system of chutes or conveyors 109 are provided for delivering articles to delivery or assembly stations 102 concurrently with the operation of the control and recording apparatus. 205 represents a card controlled contactor for automatically actuating control station 301 through the use of automatic control order tickets similar to that shown at 501 which in this instance is a punched card.

The control station which is symbolized by Fig. 3 consists of a conventional form of listing and adding machine such as is commonly used in business activities to list, say, item numbers, invoice numbers or check numbers in one column, and corresponding amounts in dollars and cents in another column. These machines are so arranged that after an item number and the corresponding dollars and cents amount are set up on the adding machine digit keys of the keyboard 304, a control key, sometimes designated as an "add" key may be actuated, causing both numbers to be recorded. After a complete group of items and amounts have been thus recorded, a different control key, sometimes designated as a "total" key may be actuated, causing a summation of all of the dollars and cents recordings to also be recorded at the foot of that column. For automatically effecting the release of merchandise items as they are recorded, and for automatically setting up the control station digit keys by means of punched cards, certain electrical features, as hereinafter explained, are incorporated in the standard adding and listing machine as commonly furnished.

In operation, as the item number and price of each desired article is set up on the proper digit keys, the "add" key is depressed to cause the recording for that article. This operation causes the translating means to operate and to cause the concurrent delivery of the corresponding article. After the group or lot of desired articles are recorded the "total" key is depressed which causes the lot total price to be mechanically calculated and recorded. In retail merchandizing practice, the tape 302 listing and totaling the lot, is torn off to serve as a sales identification and checking slip, and a duplicate copy is retained in the control station for stock control and other accounting purposes.

For this application, the "full keyboard" form of operation is illustrated and described because it has the advantage that the set up numbers are in full view so that mistakes may be readily detected and corrected right up to the time the recording is made. The fact that there are clearly defined rows of characters to be set up, avoids the likelihood of inadvertently adding or omitting a character.

In Fig. 4 there is shown a wiring diagram, detailing the electrical operation of the proposed system. For a capacity of 1000 selections, as illustrated, 10—100 pole single throw, magnet operated switches, or their equivalents, are required for the 100's selection of desired item numbers. Three of these are shown indicated by 401, 402 and 403. For the 10's selection, 10—10 pole, single throw, magnet operated switches are required. Two of these are shown, indicated by 404 and 405. The 1's selection is directly handled by the contacts of the control station keyboard. In Fig. 8 there is shown another form of magnet operated multi-pole switch whereby a plurality of contacts are operated by the action of one magnet.

A typical article storage and dispensing element is shown in diagrammatic form by 406, in which articles are stored resting against stop 407. When magnet coil is energized armature 409 drives ram 410 forward, discharging the bottom article and supporting the next to the bottom article. When the magnet coil is de-energized, a retractile spring returns the ram to the normal position shown, and permits the stored articles to descend to replace the discharged article.

The stop 407 and its supporting stem 419 when holding one of the articles, takes the position shown in the drawings. If, however, the bin is empty then a means will operate to place a mark or notation on the record sheet. When the bin is empty the supporting stem 419 will rise a little due to spring 420. This will allow contact plate 421 to open the cooperating electrical contacts thereby opening the circuit from the digit key at the central station through the magnet or relay 408.

The purpose of opening this circuit is to provide for the actuation of printing mechanism at the control station 301 to print a suitable notice or mark on the record sheet signifying that the particular item or article desired has not been delivered. Therefore the assembly and wrapping operator or clerk is notified to pick up separately the exhausted items or articles.

The preferred indication on the record sheet that stock of an article is exhausted, is a mark, character or symbol positioned near the printed item number. This symbol is similar to the asterisk or other character printed by well-known means in conventional calculating machines to designate a "total," "subtotal," et cetera. Patent No. 1,445,490 issued February 13, 1923, to Jos. C. Coffee (Fig. 3) illustrates one such means of printing various special marks or symbols through the use of printing elements similar to the denominational printing elements used to print the numerical characters. Referring to Fig. 4, it will be noted that magnet coil 424 will be energized when the control station 301 is actuated through the selective circuit to be described, unless the circuit corresponding to the selected article is incomplete owing to that particular dispensing element being empty and contact plate 421 having assumed an open circuit position, or, owing to no dispensing element having been provided for the selected article. Magnet coil 424 may thus, through conventional means, be arranged to cause a special mark or symbol to be printed adjacent to the item number of a selected item which is out of stock or for which a dispensing element has not been provided. Thus the system is arranged to either deliver the article or indicate that it has not been delivered.

It will further be understood that if an item number is selected and set up on the keyboard for which there is no corresponding dispensing bin with release magnet, the printed record of that particular item will also be made distinctive by the printing of the desired mark or designation near that particular item number. This is an important feature as it automatically indicates items which are subject to special handling. Such items are exemplified by bags of potatoes, or other bulky articles. Also, articles that are infrequently called for may be treated in the same manner as the bulky articles. It will also be understood that seasonal articles may be treated and handled in much the same manner.

In the handling of these bulky or special or seasonal articles, it has been found desirable to have a supply of these articles near the wrapping clerk so that he may readily complete the order by selecting the desired article from a small storage located behind his counter or at a suitable place near by.

As stated above, the dispensing element is shown in diagrammatical form. It will be readily understood that suitable electrically actuated dispensing elements may be provided, of a form and size to dispense various sizes and shapes of packages, cartons, cans, bottles, tubes, rolls, sheets, barrels, or other commodities. Being electrically actuated, they may be located singly or in groups wherever they can best be serviced. The bins are usually positioned in order to readily replenish the stock and to best be served by conveyor systems to deliver the released or dispensed articles to the designated delivery station.

But a single dispensing element is illustrated but others would be connected to outgoing terminals of the 10—100 pole switches in a manner similar to the one shown connected to terminal 902.

In Fig. 4 the switches shown in the lower left-hand corner represent the electrical elements of the control station keyboard. As the keys for setting up dollars and cents are not involved in this wiring diagram, they are not shown. Three columns of keys for setting up the 100's, the 10's and the 1's digits respectively of the item number are shown. The contacts which are shown associated with each of these keys are so arranged that the pair will be closed whenever the corresponding digit key is depressed to set up that particular digit number.

The incoming terminals of the 10—100 pole switches are all connected similarly to 100 bus-bars numbered 000 to 099. The left-hand or first terminal of each such switch, for instance, would be connected to the bottom bus-bar 000, the next terminal to bus-bar 001 and so on, the extremer right-hand terminal being connected to the top bus-bar 099.

The outgoing terminals of the 10—10 pole switches would be connected progressively to the 100 bus-bars 000 to 099. The left-hand terminal of the left-hand switch would be connected to 000, and the next to 001 and the last to 009. The terminals of the next 10 pole switch would be connected progressively to bus-bars 010 to 019. The last or right-hand 10 pole switch would be connected to bus-bars 090 to 099.

The incoming terminals of the 10—10 pole switches would all be connected similarly to a different series of 10 bus-bars numbered 00 to 09, which would connect to the 10 switches in the 1's column of 301. The left-hand terminal of each switch would be connected to bus-bars 00, the next terminal to 01 and the last to 09.

The magnet coils of the 10—10 pole switches would be connected to the 10 switches in the 10's column of 301. The magnet coils of the 10—100 pole switches would be connected to the 10 pole switches in the 100's column of 301.

Assuming that it is desired to select articles from dispensing element connected to 902. Key 9 of the 100's column of 301 would first be depressed. This would enable battery current to flow from battery 411, through 412, switch 9 of 100's column, 413 to magnet of multiple switch 403 which would thus become energized.

Key 0 of the 10's column of 301 would next be depressed. This would complete a circuit from battery 411, through 414, switch 0 of 10's column, 415 to magnet of multiple switch 404 which would thus become energized.

Key 2 of the 1's column of 301 would next be depressed. The circuit thus made (but not yet energized) may be traced from wire 416 through switch 2 of the 1's column, bus-bar 02 to incoming terminal 02 of switch 404 (which was actuated when key 0 of the 10's column was depressed) bus-bar 002, incoming terminal 902 of switch 403 (which was actuated when key 9 of the 100's column was depressed). Other keys are provided as shown in Fig. 3 for setting up and recording the prices of selected articles.

The system is now ready for recording the item number (and the price) which has been set up. As the recording is made by the operator pressing the "add" button of the keyboard, contact 417 is automatically closed for a period due to the recording mechanism having been started by the actuation of the "add" button, permitting battery current from 411 to flow through the circuit 417, 424, 416, 02, 002, 902, 418 to magnet 408 which will thus become energized and discharge article resting on 407.

In a similar manner, any one of 1000 different selections may be made with the three column item number keyboard.

As the recording cycle is completed, keys which have been depressed are automatically released and every element is thus restored to normal.

It will be noted that an important and distinctive feature of this system is that the circuiting necessary for the selection of a given digit is immediately accomplished when a digit key has been actuated. It will thus be seen that there are not a lot of intermediate activities to be proceeded with, such as pulsing of rotary switches and the like. Also, if a digit should be changed this may readily be accomplished without affecting the selection of other digits.

In Fig. 5 there is shown a typical order ticket such as would be associated with the displayed merchandize, each ticket indicating the item which it represents, the item number, the item price, brands and such further information or sales message as may be desired.

Whereas only manual operation of the item number and price keys of the control station has been described hereinbefore, an alternative important feature of the proposed system is the automatic setting up of item numbers and prices on the control station apparatus by means of punched card order tickets. Referring to Fig. 5, it will be noted that six horizontal rows of ten spaces are marked off. The lower three rows are for the three digits of the item number. The three upper rows are for the three digits of the price. It will be noted that the locations of the punchings shown for the item number 318 and the price 12 cents are made in accordance with this arrangement.

An odd hole 503 is shown to the left of the lower row. This is for a contact to be made to actuate the recorder as hereinafter explained. One of the lower corners of the card is also shown cut off at 502 to prevent the card being inserted incorrectly into the contactor.

Fig. 6 is a simplified wiring diagram indicating the general principle of operating the control station keyboard through the medium of punched cards. 601 is an extension of one of the 30 keys provided on the control station keyboard for setting up and recording item numbers. Attached to each such extension is a pair of contacts 602 which correspond to those shown on control station keyboard 301 of Fig. 4. Electromagnet 603 is also connected to this extension in such a manner that energizing the magnet produces the same results as manually depressing the corresponding key. Each of the 30 keys provided for setting up the item number on 301 are similarly equipped.

604 is an extension of one of 30 keys provided on 301 for setting up and recording the item price and the associated mechanical calculating functions. Electromagnet 605 is connected to this extension. Each of the 30 keys provided for setting up the item price on 301 are similarly equipped.

606 is an extension of the "add" key of 301. Electromagnet 607 is connected to this extension.

608 is a stationary block of insulating material in which are six rows of metal inserts, 609. Each row carries ten such inserts. These are spaced to register with the cross marks shown on order ticket 501, Fig. 5. 611 is a movable metal plate having sixty spring backed studs, 610, so placed as to register with the insulated electrical inserts in 608.

In operation, an order ticket 501 is placed in a slot between 608 and 610 as shown in Fig. 6. If plate 611 is then moved towards 608 the studs 610 will press ticket 501 against inserts 609. Wherever punched holes register with the spring backed studs, an electrical contact is established between the stud and the corresponding insert. This will permit current to flow from battery 612, through plate 611 and through such studs as are opposite punched holes in the card, to the corresponding inserts and to the corresponding electromagnets, such as 603 and 605. Card 501 being punched for item number 318 and price 12 cents, the keys corresponding to these figures will be operated.

The odd punching noted at 503 is for the purpose of energizing electromagnet 607 for actuating the "add" key thus causing the recording of the numbers which the other contacts have caused to be set up.

In commercial or industrial work the collection of certain small products into a small box or into a partitioned portion of a box is oftentimes desirable, especially where a group of these small products, such as bolts, nuts, set screws, washers, and the like, are added to a particular larger product as that larger product passes along an assembly line. The collection of these smaller products in their groups, in the quickest and most economical manner, is particularly desirable. The invention herein meets these desires and the collection of the small products into the group is quickly made by employing the system herein disclosed. The collection of these small products may be very readily handled by the employment of punched cards, such as that shown in Fig. 5, or equivalent control means.

Fig. 7 illustrates an end elevation of a self-contained Service Unit embodying some of the features of this invention. 706 represents a service counter at one end of the Service Unit. A super-structure 707 above the counter and the working space back of the counter houses banks of article storage and dispensing bins 704. The control station keyboard 301 is mounted on counter 706 and connected through translating relay equipment (not shown) to the dispensing bins 704. Whenever an item number and price is set up on 301 and recorded, the corresponding article will be released from its storage and delivered by gravity through chute 708 to counter 706. Aisles, like 702 permit ready replenishing of stock in the bins.

In respect to the control system which includes the operating keys and the translating or digit key controlling means, it will be noted that the improved apparatus herein for that purpose, permits the operation of a limited number of keys, for operating and controlling a very large number of separate releasing means. For instance, with the preferred "full keyboard" form of operation, thirty keys will control approximately one thousand separate releasing means, forty keys will control ten thousand, et cetera.

It will be seen from the description herein, as applied to the definite example, that a purchaser may enter a portion of a store, review the products displayed, note the prices, and thereafter make a selection. After selecting a product or brand, an order ticket is taken by the purchaser from a position near the product. Each of these order tickets includes various desired items, especially the item number or product designation, the price, the brand, or any other helpful information. After the purchaser has selected, at his own convenience, several order tickets, he presents them at the cashier's desk where the item numbers are set up in the control keyboard, and the releasing means at the bin automatically releases one of the products or items, or releases a definite number of the items or products when the releasing means is operated only once. The released products are moved or slid to the wrapping table or counter.

The cashier or clerk at the control desk operates the keys for the purpose of closing the control switches and for making a record of the item numbers and, if desired, the price thereof. After all of the order tickets have been listed the cashier completes his operation by totalling the lot price and making change. Then the record slip is taken from the machine and goes to the wrapping clerk so that he may check the items on the order, and other copies may be retained for later distribution to the auditing department, and to the supply department for the storage superintendent to take care of replacements.

In the event a product or article listed is not delivered the record sheet will so indicate and the wrapping clerk will then particularly add that article to the collected articles. In the case of bulky items the clerk will, as indicated above, select them from a supplemental supply bin near him.

It will, therefore, be readily noted that a purchaser may select desired products at his own convenience and that the several products may readily be assembled and given to the purchaser with the least possible expenditure of time and effort on the part of the clerk or clerks and with the least inconvenience to the purchaser. The purchaser's order is readily collected and wrapped and presented to the purchaser.

Various modifications and changes may be made in the apparatus herein but it is to be noted that such changes and modifications come within the scope of this invention as outlined in the claims which follow. For example the detailed construction of the various elements of the apparatus, as shown, is merely illustrative of a preferred embodiment of the invention. Furthermore, while the complete system for a retail store, for example, preferably includes (a) selection and delivery apparatus, (b) item tabulating, or recording devices, and (c) cost recording or totalizing means, installations embodying only one or two of these elements are contemplated in certain instances and such installations are within the scope of the invention.

I claim:

1. In an article assembly system, the combination of separate bins, releasing means for dispensing said articles from said bins, operator-controlled means for operating said releasing means, recording means operated in response to the operation of said operator-controlled means for concurrently making records of articles released, and means included within the operator-controlled means whereby the recording of designating numbers of articles other than those for which storage bins are provided and of articles for which bins are empty will cause a distinctive character to be printed adjacent to the article number.

2. In an article assembly system for assembling orders from articles stored in separate bins, releasing means for dispensing said articles, remote operator-controlled means for selectively operating said releasing means, recording means operated in response to the operation of said operator-controlled means for concurrently making a record of the article item number of articles released and means whereby the recording of an item number for which a storage bin is not provided, causes a distinctive mark to be printed on said record adjacent to the recording of that number.

3. In an article assembly system for assembling orders from articles stored in separate bins, releasing means for dispensing said articles, remote operator-controlled means for selectively operating said releasing means, recording means operated in response to the operation of said operator-controlled means for concurrently making records of articles released, and means including a marker in said recording means for making a notation on the record when there is no article available to be released upon the operation of the control means.

PAUL M. FARMER.